United States Patent [19]
Dennis

[11] 3,848,896
[45] Nov. 19, 1974

[54] TRAILER HITCH ASSEMBLY

[76] Inventor: Sam Dennis, 300 Winkles St., Elyria, Ohio 44035

[22] Filed: Oct. 1, 1973

[21] Appl. No.: 402,124

[52] U.S. Cl............................................. 280/423 R
[51] Int. Cl............................................. B62d 53/00
[58] Field of Search......... 280/423, 415, 438, 106 T

[56] References Cited
UNITED STATES PATENTS

| | | | |
|---|---|---|---|
| 1,818,342 | 8/1931 | McCrea | 280/423 R |
| 2,425,521 | 8/1947 | Ellberg | 280/438 R |
| 2,741,489 | 4/1956 | Bigge | 280/106 T X |
| 3,336,050 | 8/1967 | Dale | 280/423 R |
| 3,390,896 | 7/1968 | Philapy | 280/423 R |
| 3,392,992 | 7/1968 | Baker | 280/423 R |
| 3,406,852 | 10/1968 | Winckler | 280/438 R |

Primary Examiner—David Schonberg
Assistant Examiner—R. Schrecengost

[57] ABSTRACT

A trailer hitch assembly for connecting a pick-up truck and a twin I-beam frame trailer comprising an expanded L-shaped tongue structure pivotally connected over the center of the rear axle to a fifth wheel bearing face cross-bar supported at its ends by removable end supports bolted to the truck bed.

2 Claims, 3 Drawing Figures

TRAILER HITCH ASSEMBLY

BACKGROUND OF THE INVENTION

1. Field Of The Invention

The invention pertains to a trailer hitch assembly wherewith a heavy load carrying twin I-beam frame trailer is hitched to a pick-up truck, or the like. Hitch assemblies pivotally connected over the center of the rear axle reduce imbalance on a draft vehicle. A trailer hitch assembly wherewith a heavy load carrying trailer is hitched to a pick-up truck, or the like is limited relative to strength, weight, static and dynamic characteristics by the trailer hitch assembly.

2. Description Of The Prior Art

Known prior art pivotally connected over the center of the rear axle reduces imbalance on a pick-up truck, or the like draft vehicle. Although a variety of hitch assemblies have been devised for a pick-up truck, or the like, no known hitch assembly wherewith a heavy load carrying twin I-beam frame trailer is hitched to a pick-up truck, or the like is constructed pivotally connected over the center of the rear axle which satisfactorily solves the problems specific to a pick-up truck, or the like draft vehicle.

SUMMARY OF THE INVENTION

The present invention pertains to an improved trailer hitch assembly wherein one end of an expanded L-shaped tongue structure is affixed uniquely to the front end of a twin I-beam frame trailer and the other end is pivotally connected over the center of the rear axle to a fifth wheel bearing face cross-bar by a pivot pin so that it is free to pivot. Two removable end supports projecting upwardly from the truck bed over the fender walls support a fifth wheel bearing face cross-bar free to pivot limitedly about its end point supported axis. The pivot pin connects the trailer to the pick-up truck, or the like.

It is an object of this invention to provide an improved trailer hitch assembly.

It is a further object of this invention to provide an improved trailer hitch assembly for connecting a pick-up truck and twin I-beam frame trailer wherewith the pick-up truck can make substantially sharper turns at substantially higher dynamic rates without inducing unstable reponses.

It is a further object of this invention to provide an improved trailer hitch assembly for connecting a pick-up truck and twin I-beam frame trailer with greater strength and reduced overall weight.

It is a further object of this invention to provide an improved trailer hitch assembly for connecting a pick-up truck and twin I-beam frame trailer affixed uniquely to the front end thereof.

These and other objects of this invention will become apparent to those skilled in the art upon consideration of the accompanying specification, claims and drawings.

DESCRIPTION OF THE PREFERRED EMBODIMENT

Figure 1:
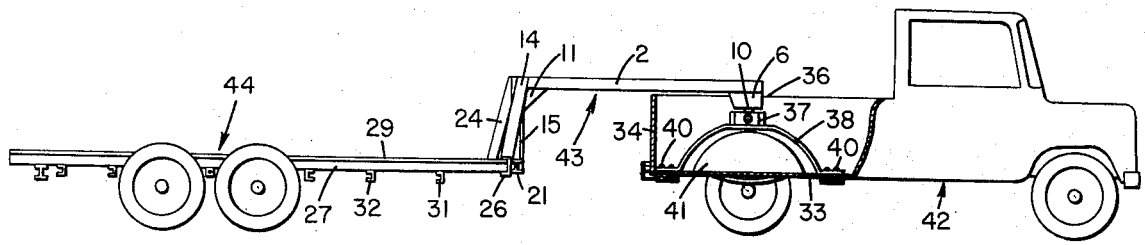
FIG. 1 is a side elevation view of a twin I-beam trailer having the improved trailer hitch assembly uniquely affixed thereto and connected to a pick-up truck, a portion thereof broken away.
Figure 2:
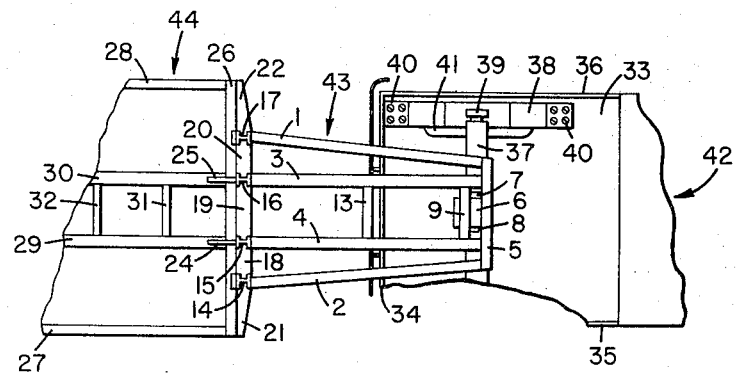
FIG. 2 is a top view of a twin I-beam trailer having the improved trailer hitch assembly uniquely affixed thereto and connected to a pick-up truck, portions thereof broken away.
Figure 3:
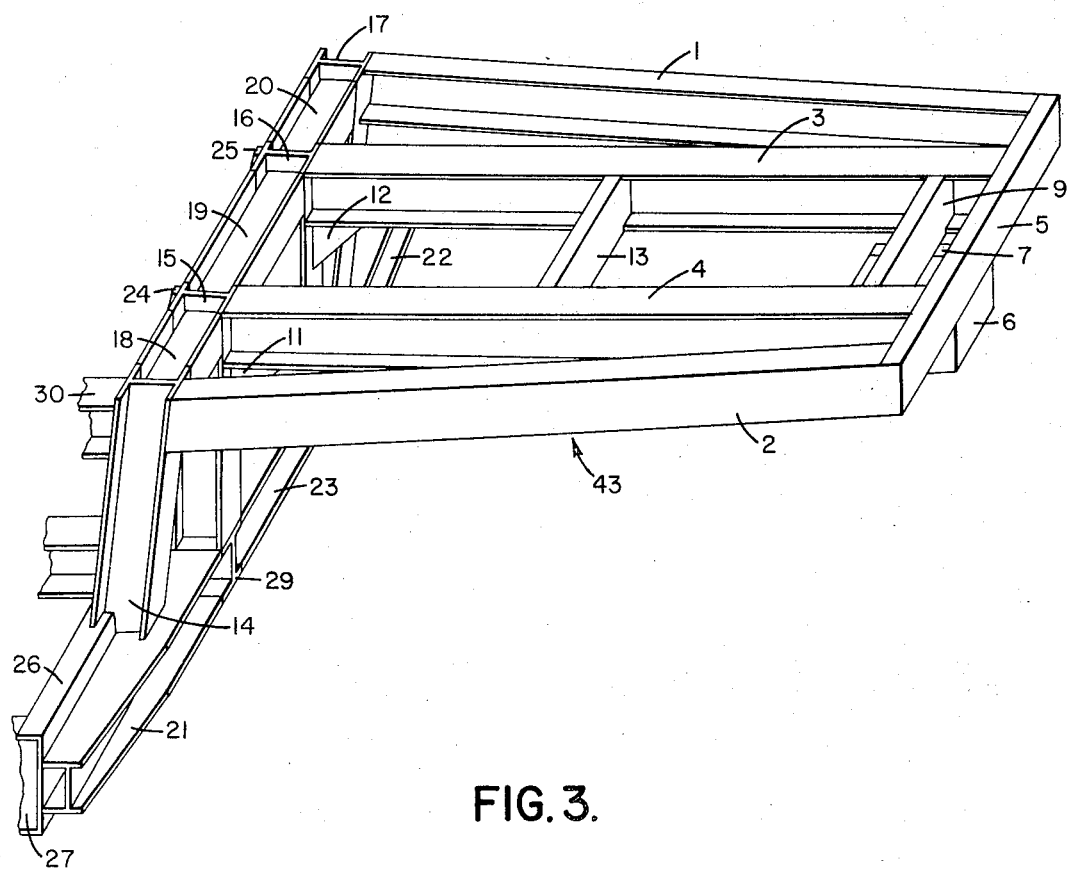
FIG. 3 is an enlarged perspective view of the improved trailer hitch assembly uniquely affixed to the front end portion of a twin I-beam trailer.

In the preferred embodiment the numeral 42 designates a pick-up truck. The numeral 44 generally designates a twin I-beam frame trailer with trailer hitch assembly generally designated 43 affixed uniquely to the front end thereof.

In the preferred embodiment of the trailer hitch assembly 43 an expanded L-shaped tongue structure for a twin I-beam frame trailer 44 is constructed by affixing perpendicularly one end of vertical twin I-beam tongue structure members 15 and 16 to the upper flange areas of twin I-beam trailer frame members 29 and 30 and the forward face area of channel trailer frame member 26 wherein the web sections of members 15 and 16 are aligned with the planes of the web sections of members 29 and 30. Typical construction of a twin I-beam frame trailer is further illustrated by members 27, 28, 31 and 32. Members 29 and 30 extend through rectangular apertures in the forward face of member 26 beyond the forward face of said member 26. I-beam tongue structure base members 21 and 22 are affixed to the forward face area of member 26 and affixed perpendicularly to members 29 and 30 with the flange faces of members 21 and 22 aligned in horizontal planes with the flange faces of members 29 and 30. Member 21 is perpendicularly affixed to the outward side of member 29 and member 22 is perpendicularly affixed to the outward side of member 30. I-beam tongue structure base member 23 is affixed to the forward face area of member 26 and affixed perpendicularly to the inward sides of members 29 and 30 with the flange faces of member 23 aligned in horizontal planes with the flange faces of members 29 and 30. One end of twin I-beam tongue structure members 14 and 17 is affixed to the upper and forward face areas of member 26 and the upper flange areas of members 21 and 22. Members 14 and 17 extend forward such that the web sections are aligned parallel to the web sections of members 15 and 16 and are outwardly spaced therefrom with the upper ends of said members 14 and 17 aligned with the upper ends of said members 15 and 16. Upper horizontal I-beam tongue structure members 18 and 20 have one end affixed perpendicularly to the upper ends of members 15 and 16 with the flange faces of member 19 aligned in planes with the flange faces of said members 15 and 16. Upper horizontal I-beam tongue structure members 18 and 20 have one end affixed perpendicularly to the upper ends of members 15 and 16 with the flange faces of members 18 and 20 aligned in a plane with the flange faces of said members 15 and 16 and affixed at the opposite ends to the upper ends of members 14 and 17. One end of tongue structure braces 24 and 25 is affixed to the upper rearward flange face areas of members 15 and 16. Members 24 and 25 extend rearward at an appropriate angle with the opposite ends affixed to the upper flange face areas of members 29 and 30.

In the preferred embodiment one end of horizontal twin I-beam tongue structure members 3 and 4 is affixed perpendicularly to the upper forward flange faces of members 15 and 16. Members 3 and 4 extend forward the required length such that the flange faces are aligned in horizontal planes with channel tongue structure member 5 being affixed perpendicularly to the opposite ends of members 3 and 4. One end of horizontal twin channel tongue structure members 1 and 2 is affixed to the upper forward flange faces of members 14 and 17. Members 1 and 2 extend forward horizontally at a divergent angle with member 5 being affixed at its rearward ends to the opposite ends of members 1 and 2. Structural fillets 11 and 12 are affixed in the corners of perpendicularly adjoined members 3–16 and 4–15. Channel tongue structural members 9 and 13 are affixed perpendicularly to members 3 and 4. Member 9 is located so as to accommodate mounting hitch box member 6 with member 13 located near the midpoint length of members 3 and 4. Affixed to the upper side faces of member 6 and aligned with the upper edges of its side faces are angle members 7 and 8. Members 7 and 8 are affixed perpendicularly to members 5 and 9 at the lower faces of said members 5 and 9. Pivot pin member 10 is connected to member 6 and over the center of the rear axle to the fifth wheel bearing cross-bar 37. Removable end support bracket 38 and opposite bracket are affixed to truck bed 33 with truck box sides 35 and 36 and rear door 34 by bolts 40 and project upwardly over fender walls 41 and opposite fender wall. Fifth wheel bearing face cross-bar 37 is connected to cross-bar pivot mount 39 and opposite pivot mount which are affixed to the upper surfaces of support bracket 38 and opposite support bracket. Further, this unique and novel expanded L-shaped tongue structure construction of the trailer hitch assembly reduces strain and unstable responses permitting substantially sharper turns at substantially higher rates and provides greater strength with reduced overall weight. The unique affixation of the trailer hitch assembly permits attainment of optimum strength, weight, static and dynamic characteristics.

While I have shown and described a specific embodiment of this invention, further modifications and improvements will occur to those skilled in the art and I intend in the appended claims to cover all modifications which do not depart from the spirit and scope of this invention.

What is claimed is:

1. An improved trailer hitch assembly member for connecting a twin I-beam frame trailer to a pick-up truck, or the like, comprising:
   a. an expanded L-shaped tongue structure member, a first end portion of said tongue structure member uniquely affixed to the front end portion of a twin I-beam frame trailer is constructed of vertical twin I-beam tongue structure members being affixed perpendicularly to the forward end portion of the upper flange areas with their web sections aligned in a plane with the web sections of twin I-beam frame trailer members extended forwardly beyond the forward face of a horizontal perpendicularly adjoined channel trailer frame member and to the upper forward face area of said channel trailer frame member;
   b. I-beam tongue structure base members affixed to the forward face area of said channel trailer frame member and perpendicularly to said twin I-beam trailer frame members at their inner sides with the flange faces of said base member aligned in horizontal planes with the flange faces of said twin I-beam trailer frame members;
   c. twin I-beam tongue structure members outwardly spaced with their web sections in parallel planes with respect to said vertical twin I-beam tongue structure members affixed to the upper and forward flange areas of said outwardly extended base members and extending forward so that the upper ends are aligned with the upper ends of said vertical twin I-beam tongue structure members;
   d. tongue structure braces affixed to the upper rearward flange areas of said vertical twin I-beam tongue structure members and extending rearward at an appropriate angle with the opposite ends affixed to the upper flange face areas of said twin I-beam trailer frame members.

2. The improved trailer hitch assembly uniquely affixed as in claim 1 for connecting a twin I-beam frame trailer to a pick-up truck, or the like comprising:
   a. an expanded L-shaped tongue structure member, a remaining first end portion of said tongue structure member is constructed of an upper horizontal I-beam tongue structure member affixed perpendicularly to the upper ends of said vertical twin I-beam tongue structure members with the flange faces of said upper horizontal I-beam tongue structure members aligned in planes with the flange faces of said vertical twin I-beam tongue structure members;
   b. upper horizontal I-beam tongue structure members having one end affixed perpendicularly to the upper ends of said vertical twin I-beam tongue structure members with the flange faces of said upper horizontal I-beam tongue structure members aligned in a plane with the flange faces of said vertical I-beam tongue structure members and affixed perpendicularly at the opposite ends to the upper ends of said first end portion outward twin I-beam tongue structure members;
   c. a second end portion constructed of horizontal twin I-beam tongue structure members extending the required length forward, one end of which is affixed perpendicularly to the upper flange faces of said vertical twin I-beam tongue structure members;
   d. horizontal twin channel tongue structure members extending forward at a divergent angle, one end of which is affixed to the upper flange faces of said first end portion outward twin I-beam members and the other end aligned with the required length of said second end portion horizontal twin I-beam tongue structure members;
   e. a channel tongue structure member affixed perpendicularly at its rearward side to the forward ends of said second end portion horizontal twin I-beam tongue structure members and at its rearward side ends to the forward ends of said second end portion twin channel tongue structure members;
   f. a channel tongue structure member affixed perpendicularly near the midpoint length to said second end portion horizontal twin I-beam tongue structure members at their inward sides;
   g. a channel tongue structure member affixed perpendicularly forward of the midpoint length to said second end portion horizontal twin I-beam tongue structure members at their inward sides so as to accommodate mounting of a hitch box member;
h. structural fillets affixed in the corners of perpendicularly adjoined said first portion vertical twin I-beam tongue structure members and said second end portion horizontal twin I-beam tongue structure members;
i. a rectangular base hitch box member with angle members aligned with the upper edges of its side faces and affixed outwardly extending thereto with said side angle members affixed perpendicularly to the lower face areas of the two forward second end portion channel tongue structure members which are affixed perpendicularly to said second end portion horizontal twin I-beam tongue structure members;
j. a pivot pin member free to pivot for connecting the trailer to the pick-up truck, or the like connected to said hitch box member and a fifth wheel bearing cross-bar connected at its ends so that it is free to pivot limitedly to cross-bar pivots supported over the rear axle by removable end supports projecting upwardly over the fender walls from the truck bed and bolted thereto.

* * * * *